G. G. CROWLEY.
Wheel-Harrow.
No. 226,839. Patented April 27, 1880.
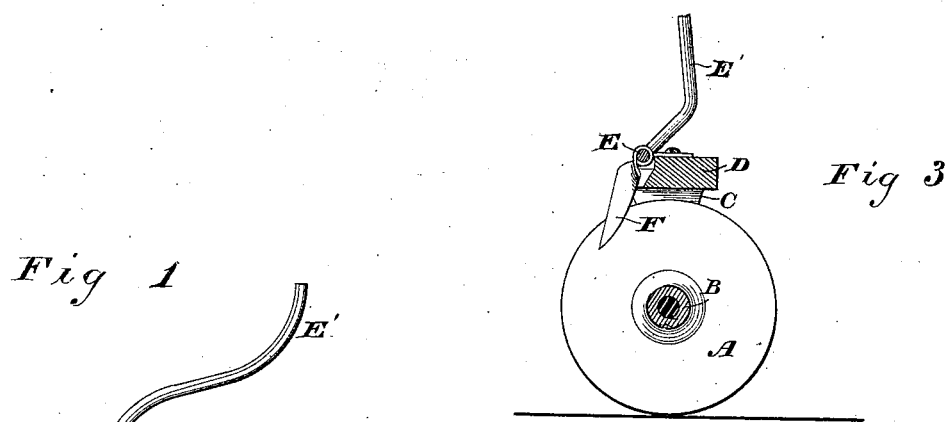
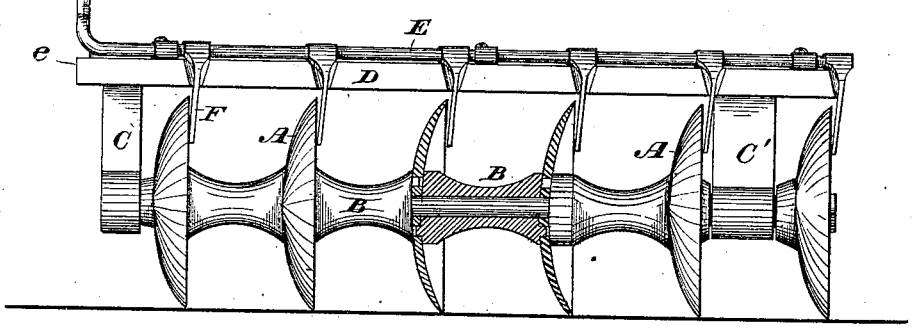
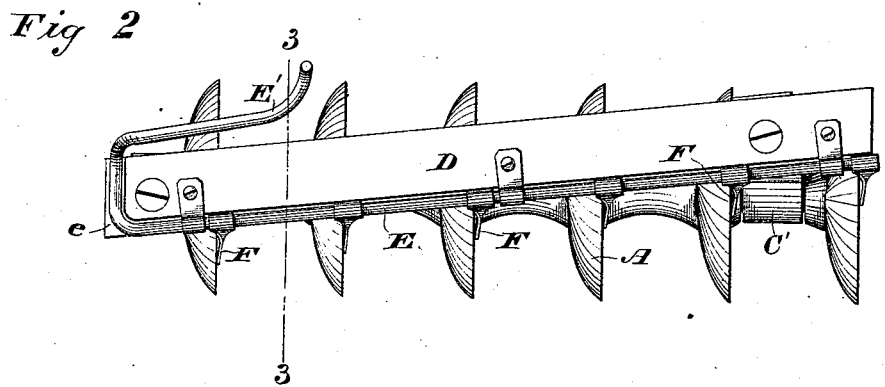
WITNESSES
Wm A Skinkle
Roberdeau Buchanan
INVENTOR
George G. Crowley,
By his Attorneys
Baldwin Hopkins & Peyton

UNITED STATES PATENT OFFICE.

GEORGE G. CROWLEY, OF LITTLE FALLS, NEW YORK, ASSIGNOR TO FRANK BRAMER, OF SAME PLACE.

WHEEL-HARROW.

SPECIFICATION forming part of Letters Patent No. 226,839, dated April 27, 1880.

Application filed May 23, 1878.

*To all whom it may concern:*

Be it known that I, GEORGE G. CROWLEY, of Little Falls, in the county of Herkimer and State of New York, have invented certain new and useful Improvements in Wheel-Harrows, of which the following is a specification.

My invention relates to that class of wheel or disk harrows in which the disks rotate in gangs. Its object is to secure a simple and effective organization of scrapers or clearers and disks, whereby the driver, while in his seat on the machine, may bring the scrapers close to or in contact with the sides of the disks to remove clogging, adhering, or obstructing matter therefrom, and when the disks are clear may remove the scrapers therefrom to prevent the collection of clogging matter upon the scrapers or its accumulation between them and the disks or wheels.

To these ends my invention consists, first, in combining with a series of concavo-convex harrow disks or wheels a series of scrapers or clearers fixed upon a turning bar or rock-shaft, whereby the scrapers or clearers may be operated to bring them in contact with the concave sides of the disks or to move them away therefrom by simply rocking the scraper bar or shaft in its bearings; second, in combining with a gang of rotating harrow-disks a revolving, rocking, or turning scraper-bar placed in a different plane from the disk shaft or axle to permit the scrapers or clearers readily to enter and leave the concave sides of the disks; third, in combining a gang bar or beam, a gang of rotating harrow-disks, the shaft or axle of which has its bearings in pendants or brackets projecting from the gang-bar, a turning or rocking bar having scrapers or clearers fixed thereon, mounted on the gang-bar so as to be in a different plane from the disk shaft or axle, and a lever for controlling the scrapers.

In the accompanying drawings, which show so much of a wheel-harrow embodying my improvements in the best way now known to me as is necessary to illustrate the subject-matter herein claimed, Figure 1 is a rear elevation of one of the wheel or disk gangs of a harrow provided with my improvements; Fig. 2, a top or plan view thereof, and Fig. 3 a transverse section therethrough on the line 3 3 of Fig. 2.

I have shown in the drawings but one gang of disks, that being sufficient to exhibit the organization and mode of operation of the devices constituting my improvements. My improvements are designed, however, to be used in connection with wheel-harrows of well-known construction or of any approved forms, their application being more especially contemplated in harrows having separate gangs of disks, one each on opposite sides of an intermediate draft-frame, and each of which is adjustable to vary the angle of the disks relatively to the line of draft, and also free to move or vibrate to conform to undulations in the ground over which the harrow may be drawn.

Disks or wheels A having a concave face are mounted upon and rotate on or with a shaft or axle, B, having its bearings in pendent arms or brackets C C' secured to a gang-bar, D, in well-known ways.

Upon the rear edge of the gang bar or beam, in this instance, is mounted a shaft or bar, E, to which is firmly fixed, keyed, or attached a series of clearers or scrapers, F, corresponding in number to the disks or wheels, one scraper for each disk. The shaft or bar is capable of being revolved or rocked in its bearings by a lever, E', extending to within easy reach of the driver when seated on the machine in such manner that the scrapers or clearers may be adjusted or brought close to or in contact with the sides of the disks or wheels to clear them of obstructing matter.

The gang-bar, it will be observed, lies in a different vertical plane from that of the disk or wheel shaft, which is occasioned in this instance by carrying forward the upper end of the bracket or standard C', or the sloping of the standard from its point of attachment to the gang-bar to the point of support on the disk shaft or axle, the different vertical planes of gang-bar and disk-shaft being clearly shown in Fig. 2. It will thus be obvious that by rocking the lever the scrapers can be brought in contact with the concave faces or sides of the disks, or sufficiently close thereto to remove any adhering earth or other obstructing matter, or moved away from the disks when they are clear and free, to prevent clogging between the disks and scrapers.

The range of movement of the controlling-lever is limited in this instance in one direction by the abutting of the scrapers against the gang-bar, and in the other or forward direction by a shoulder or stop, e, formed by a bent portion of the scraper-bar coming in contact with the gang-bar, the scraper-bar and lever being shown in the present instance as composed of a single bar or rod bent into the required shape.

The various details above mentioned may be varied somewhat without departing from my invention. For instance, the lever may be provided with a locking-detent to secure it in any desired position; and, instead of the lever and scraper-bar being in one piece, they may be constructed separately or in other ways; and, instead of both the gang-bar and scraper-bar being arranged in a different plane from that of the disk shaft or axle, the scraper-bar may be parallel to the axle and its scraper so arranged that they may be vibrated toward or from the sides of the disks.

I am aware that a hinged scraper controlled by a lever has been used to remove clogging matter from a land-roller. I am also aware that hinged scrapers, one to each disk, controlled by a reciprocating bar so as to swing toward or from the face of the disk, have been used. But I believe myself to be the first to mount a series of scrapers, one to each disk, on a shaft rocking on a gang-bar in such a manner as to cause the scrapers to approach the concave faces of the disks.

I claim as my invention—

1. The combination, substantially as hereinbefore set forth, of a series of concavo-convex harrow-disks with a series of scrapers or clearers fixed upon a turning bar or rock-shaft, whereby the scrapers or clearers may be operated to bring them close to or in contact with the concave sides of the disks, or to remove them therefrom, by simply rocking the scraper bar or shaft in its bearings.

2. The combination, substantially as hereinbefore set forth, with a gang of rotating harrow-disks, of a revolving, rocking, or turning scraper-bar placed in a different plane from the disk shaft or axle to permit the scrapers or clearers to enter the concave sides of the disks.

3. The combination, substantially as hereinbefore set forth, of a gang bar or beam, a gang of rotating harrow-disks, the shaft or axle of which has its bearings in supports on the gang-bar, a turning or rocking bar provided with scrapers or clearers mounted on the gang-bar in a different plane from the disk shaft or axle, and a lever for controlling the scrapers.

In testimony whereof I have hereunto subscribed my name.

G. G. CROWLEY.

Witnesses:
SIDNEY A. LOOMIS,
WATTS T. LOOMIS.